United States Patent [19]

Seki

[11] Patent Number: 5,774,289
[45] Date of Patent: Jun. 30, 1998

[54] DIGITAL VIDEO TAPE RECORDER FOR RECORDING DATA BLOCKS WITH INNER AND OUTER PARITY DATA AND ID DATA HAVING REED-SOLOMAN ERROR CORRECTION CODE

[75] Inventor: Takahito Seki, Kanagawa, Japan

[73] Assignee: Sony Corporation, Tokyo, Japan

[21] Appl. No.: 752,825

[22] Filed: Nov. 20, 1996

Related U.S. Application Data

[63] Continuation of Ser. No. 415,291, Apr. 3, 1995, Pat. No. 5,583,707, which is a continuation of Ser. No. 285,874, Aug. 4, 1994, Pat. No. 5,404,249, which is a continuation of Ser. No. 992,001, Dec. 17, 1992, abandoned.

[30] Foreign Application Priority Data

Dec. 25, 1991 [JP] Japan ..................................... 3-357826

[51] Int. Cl.⁶ ....................................................... G11B 5/09
[52] U.S. Cl. .............................................. 360/48; 360/53
[58] Field of Search .................................. 360/48, 53, 27; 371/37.1, 37.4; 386/96, 35, 101, 104, 48, 92; 341/68

[56] References Cited

U.S. PATENT DOCUMENTS 5,583,707   12/1996   Seki ........................................... 360/48

Primary Examiner—Aristotelis M. Psitos
Assistant Examiner—Patrick Wamsley
Attorney, Agent, or Firm—William S. Frommer; Alvin Sinderbrand

[57] ABSTRACT

In a digital video tape recorder that has rotary magnetic heads for recording digital video information on a magnetic tape in the form of data blocks having a predetermined length, an ID signal is generated for each data block. The ID signal includes a number of data bits which identify the address of the data block, the information contained in the data block, and so forth. For the purpose of generating error code parity symbols, the ID signal is divided into a sequence of four-bit symbols, and at least two parity symbols are generated according to an error correction code for correcting errors in the sequence of four-bit symbols. The ID signal and parity symbols are recorded together on the magnetic tape. In this way, error correction can be performed on the ID signal during reproduction.

8 Claims, 6 Drawing Sheets

DIGITAL VIDEO TAPE RECORDER FOR RECORDING DATA BLOCKS WITH INNER AND OUTER PARITY DATA AND ID DATA HAVING REED-SOLOMAN ERROR CORRECTION CODE

This application is a continuation of application Ser. No. 08/415,291, filed Apr. 3, 1995, now U.S. Pat. No. 5,583,707, which is a continuation of application Ser. No. 08/285,874, filed Aug. 4, 1994, now U.S. Pat. No. 5,404,249, which is a continuation of application Ser. No. 07/992,001, filed Dec. 17, 1992, now abandoned.

FIELD OF THE INVENTION

This invention relates to an apparatus and method for recording digital signals on a magnetic tape in the form of data blocks, and more particularly is directed to error correction coding of data block ID signals.

BACKGROUND OF THE INVENTION

It is known to digitize analog signals such as a color video signal and an audio signal and to record the resulting digital signals on a magnetic recording medium such as a magnetic tape. Typically, the digital signals are recorded in the form of data blocks of a predetermined length, and with a synchronizing signal at the beginning of each block, so that the synchronizing signals are recorded at regular intervals on the record medium. The data blocks are sometimes referred to as "sync blocks".

Each sync block includes data that represents the address of the block and the type of information recorded in the block so that the signal can be correctly processed during reproduction. The data may include, for instance, an identification of the type of information as a video or audio signal and, in the case of a video signal, may indicate the screen position of the signal information contained in the sync block. This identifying data concerning the address and information type are generically referred to as an "ID signal".

If an error occurs in the ID signal during recording or reproduction, such an error can significantly disrupt the reproduction of the recorded signal. Moreover, unlike the video and audio signals, the ID signal does not have temporal and spatial correlation, so that errors in the ID signal cannot be readily corrected by interpolation.

It is known to add a parity byte to the ID signal in order to permit error detection upon reproduction. Since error correction is also desirable, it has been proposed to encode the ID signal with an error correction code. In error correction codes, such as the Reed-Solomon code, at least two parity symbols are required. Accordingly, it has been proposed to add two parity bytes (8 bits each) to the ID signal. But since the ID signal itself usually consists of only a few bytes, this proposal results in increased redundancy in the data to be recorded.

OBJECTS AND SUMMARY OF THE INVENTION

Accordingly, it is an object of this invention to provide a method and apparatus in which the data block ID signal is error correction coded without increasing the degree of data redundancy.

In accordance with an aspect of the present invention, in a method and apparatus using rotary magnetic heads for recording digital information on a magnetic tape in the form of data blocks having a predetermined length, an ID signal is generated for each data block and includes a plurality of data bits which identify at least a selected one of an address of the respective data block and a characteristic of the information contained in the respective data block, the ID signal is divided into a sequence of four-bit symbols, and at least two parity symbols are generated according to an error correction code for correcting an error in the sequence of four-bits symbols whereupon, the parity symbols are recorded on the magnetic tape with the ID signal. In this way, error correction is provided, along with error detection, without increasing the degree of redundancy in the data.

The above, and other objects, features and advantages of the present invention will be apparent from the following detailed description thereof which is to be read in connection with the accompanying drawings.

DETAILED DESCRIPTION OF THE PREFERRED EMBODIMENT

Figure 1:
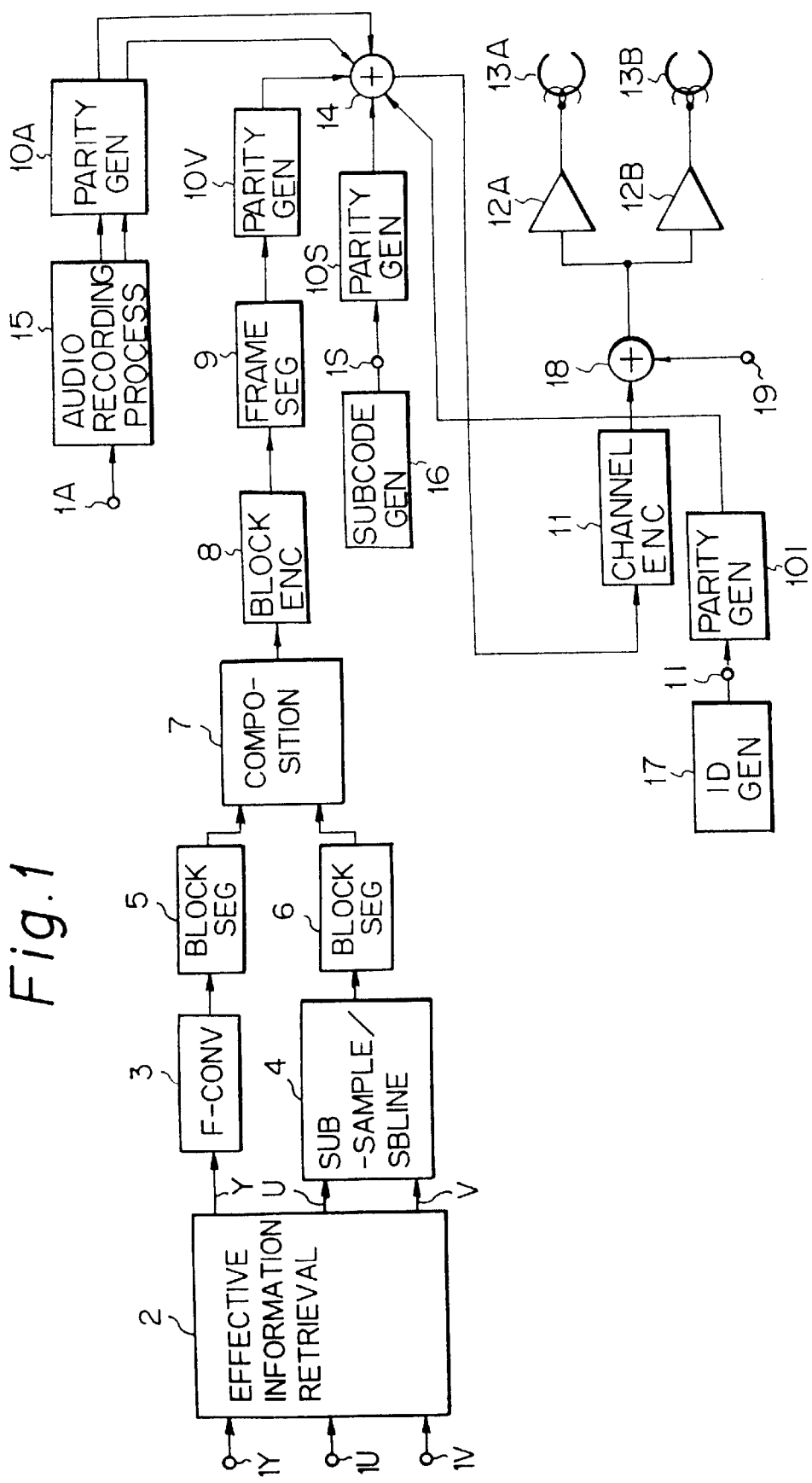
FIG. 1 is a block diagram of the recording circuit of a digital video tape record (VTR) according to an embodiment of the invention.

A signal recording portion of a digital VTR according to an embodiment of the present invention will now be described with reference to FIG. 1. As shown therein, a digital luminance signal Y and digital color difference signals U and V, formed from three primary color signals R, G and B, are respectively supplied to input terminals 1Y, 1U, and 1V. The three primary color signals R, G and B may, for example, be supplied from a color video camera for suitable processing and digitizing in order to provide the input signals as just described. The respective clock rates of the input signals are 13.5 Mhz for the luminance signal and 6.75 Mhz for each of the color difference signals, and the number of bits per sample is 8 bits. The signals from the input terminals, 1Y, 1U and 1V are supplied to an effective information retrieval circuit 2 which is adapted to omit or remove data from the received signals during the blanking intervals and to retrieve information only from the effective area.

The luminance signal Y from the effective information retrieval circuit 2 is supplied to a frequency conversion circuit 3. The frequency conversion circuit 3 converts the sampling frequency from 13.5 MHz into a frequency which is three-fourths of 13.5 MHz. The frequency conversion circuit 3 may include a thin-out filter so as to prevent reflected distortion from occurring. The output signal of the frequency conversion circuit 3 is supplied to a block segmentation circuit 5. The block segmentation circuit 5 converts the received scanning sequence luminance data into a block sequence. The block segmentation circuit 5 is provided to condition the data for processing by a block encoding circuit 8 disposed at a later stage of the recording circuit.

Figure 3:
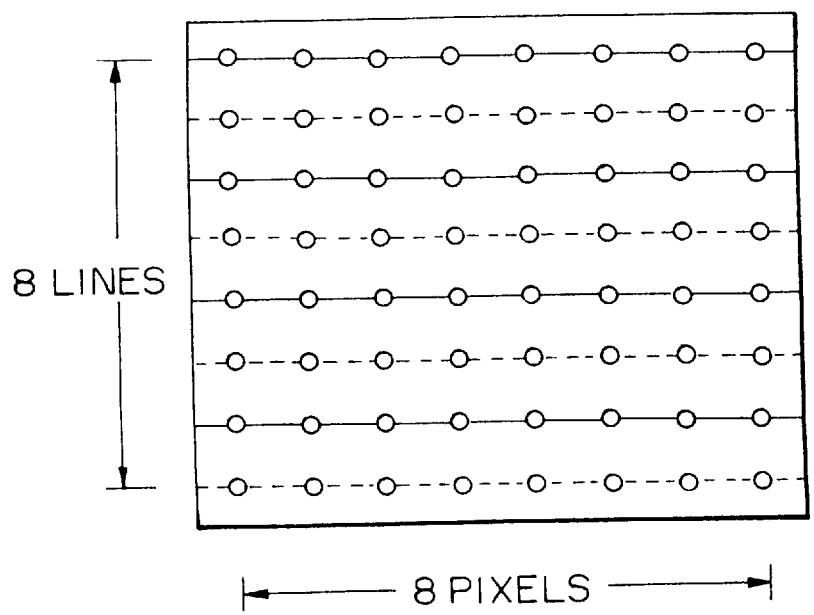
FIG. 3 is a schematic diagram to which reference will be made in describing block encoding.

FIG. 3 is a schematic diagram illustrating a data block upon which block encoding is to be performed. As shown in FIG. 3, the block is composed of 64 picture elements, taken as a matrix of 8 lines by 8 pixels. In FIG. 3, the solid lines represent lines associated with odd-numbered fields, while the broken lines represent lines associated with even-numbered fields.

Returning to FIG. 1, it will be seen that the two color difference signals U and V are supplied to a sub-sampling and sub-line processing circuit 4. The sub-sampling and sub-line processing circuit 4 converts the sampling frequency from 6.75 MHz into a frequency that is one-half of 6.75 MHz and then alternately selects one of the two digital color digital difference signals for each line. Thereafter, the sub-sampling and sub-line processing circuit 4 composes the two digital color difference signals into one channel of data and outputs a line sequential digital color different signal.

Figure 4:
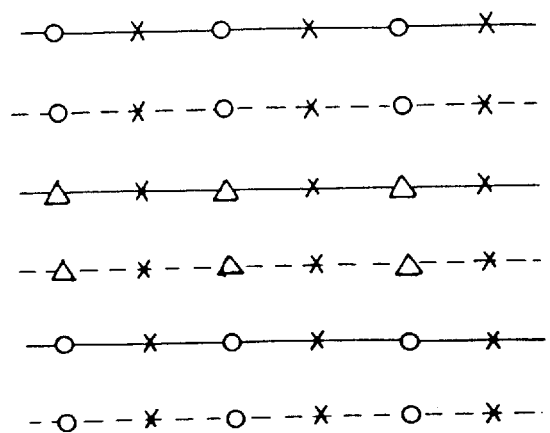
FIG. 4 is a schematic diagram to which reference will be made in describing sub-sampling and sub-line processing.

FIG. 4 shows picture elements of a signal which has been sub-sampled and sub-lined by the circuit 4. In FIG. 4, "O" represents a sampling picture element of the first color difference signal U; "Δ" represents a sampling picture element of the second color difference signal V; and "X" represents a position in which a picture element has been thinned out by the sampling processing.

The line sequential signal from the sub-sampling and sub-line processing circuit 4 is supplied to a block segmentation circuit 6. In a manner similar to block segmentation circuit 5, the block segmentation circuit 6 converts scanning sequence color difference data into a block sequence data arrangement with each block consisting of 8×8 pixels. The output signals of the block segmentation circuits 5 and 6 are supplied to a composing circuit 7.

The composing circuit 7 converts the received luminance signal and the color difference signal which have been converted into respective block sequence signals into one channel of data. The output signal of the composing circuit 7 is supplied to a block encoding circuit 8. Block encoding circuit 8 may, for example, apply adaptive dynamic range coding (ADRC) or may perform a discrete cosine transform (DCT) in order to compression-code the data blocks supplied thereto.

The output signal of block encoding circuit 8 is supplied to a frame segmentation circuit 9. The frame segmentation circuit 9 converts the received signal into data in a frame arrangement and converts a picture system data clock into a record system clock.

The output signal of the frame segmentation circuit 9 is supplied to a parity generation circuit 10V which generates an error correction code parity signal. The output signal of the parity generation circuit 10V, including the frame-segmented video data and the parity signal, is supplied to a mixing circuit 14.

A PCM digital audio signal is supplied from an input terminal 1A to an audio recording processing circuit 15. The audio recording processing circuit 15 may, for example, be adapted to compress the received audio signal by differential pulse code modulation (DPCM) processing. The audio recording processing circuit 15 outputs recording data for two separate recording regions (referred to as "audio 1" and "audio 2") disposed in each track to be recorded on the magnetic tape. The output data of the audio recording processing circuit 15 is supplied to a parity generation circuit 10A which generates an error correction code parity signal. The output signal from parity generation circuit 10A, which includes the audio data and the parity signal, is supplied to mixing circuit 14.

A subcode generating circuit 16 generates a subcode which is supplied to a parity generating circuit 10S via an input terminal 1S. Parity generating circuit 10S encodes the subcode by means of an error correction code, thereby generating parity signals. The subcode and the parity signals generated by parity generating circuit 10S are supplied to mixing circuit 14.

An ID signal generating circuit 17 generates an ID signal which will be described below. The ID signal generated by ID signal generating circuit 17 is supplied to a parity generating circuit 10I via an input terminal 1I. Parity generating circuit 10I performs error correction coding on the ID signal in a manner to be described below. The resulting signal is output to mixing circuit 14.

Mixing circuit 14 is adapted to combine the received signals from the parity generation circuits 10A, 10V, 10S and 10I such that video data, audio data and subcode data are arranged in a predetermined pattern. The output signal of mixing circuit 14 is supplied to a channel encoder 11 which performs channel encoding so as to decrease the-low band of the data to be recorded. The output signal of channel encoder 11 is supplied to a mixing circuit 18, which also receives a pilot signal for automatic track following (ATF) via a terminal 19. The pilot signal is a low frequency signal which can be separated from the recorded data upon reproduction. The signal output from mixing circuit 18 is supplied through recording amplifiers 12A and 12B and rotating transformers (not shown) to magnetic heads 13A and 13B, respectively, and then recorded on a magnetic tape (not shown).

The reproduction section of the digital VTR will now be described with reference to FIG. 2.

Figure 2:
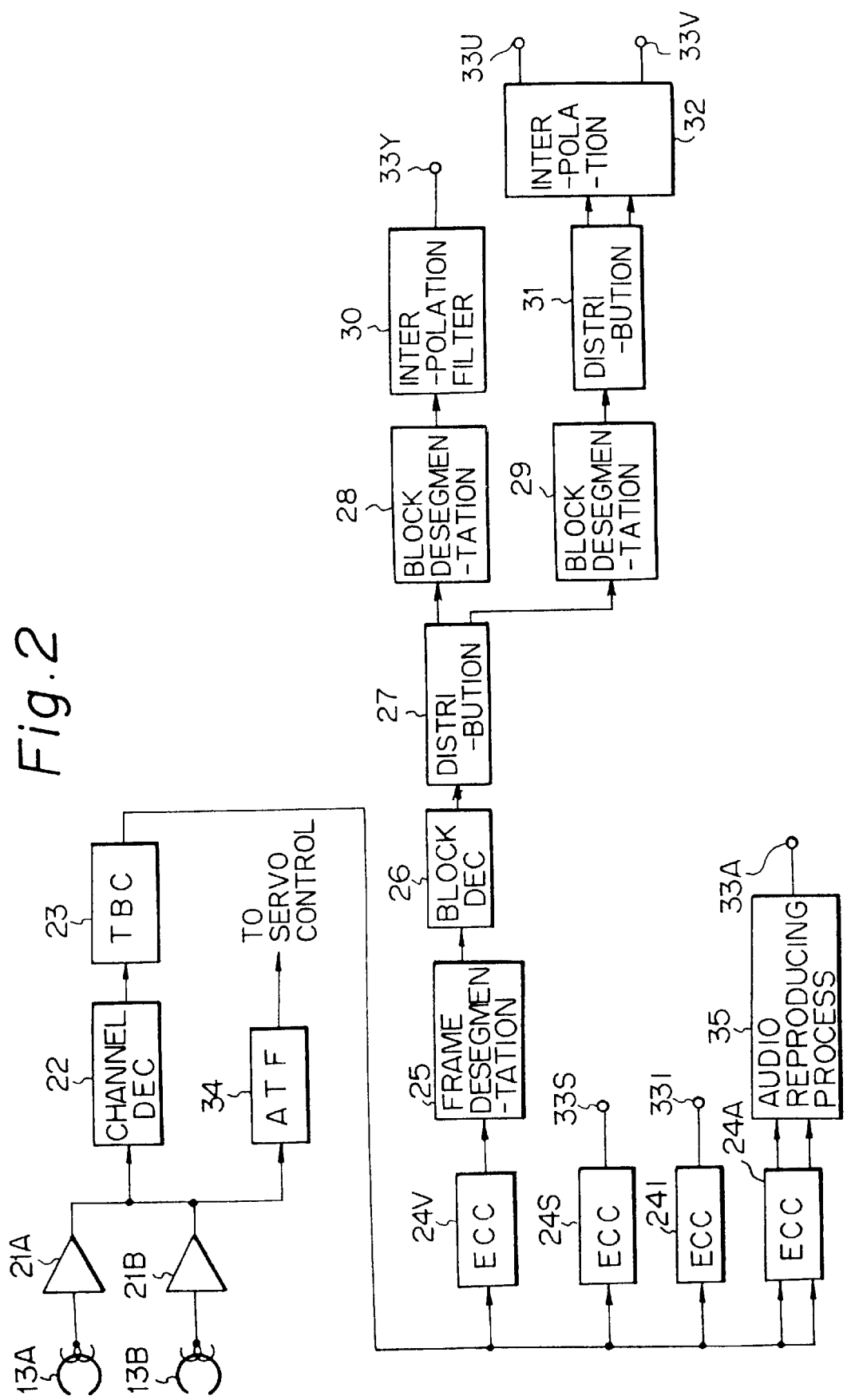
FIG. 2 is a block diagram of the playback circuit of the embodiment of FIG. 1.

As shown in FIG. 2, playback data is obtained from the magnetic tape (not shown) by magnetic heads 13A and 13B and supplied through rotating transformers (not shown) and playback amplifiers 21A and 21B, respectively, to a channel decoder 22. Clock signals and block synchronizing signals present in the reproduced signal are extracted by a circuit (not shown) which is disposed before channel decoder 22.

In addition, ATF signals are provided from amplifiers 21A and 21B to ATF circuitry 34 which provides tracking control signals to a servo control system (not shown) in a known manner. For example, automatic track following may be performed as in the known 8 mm format VTR in which the servo control system that receives the tracking control signal is a phase servo for controlling the phase of rotation of a capstan.

Channel decoder 22 is adapted to reverse the channel encoding performed by channel encoder 11. The output signal of the channel decoder 22 is supplied to a time base correction (TBC) circuit 23 which removes time base errors from the reproduced signal. The reproduced playback from the TBC circuit 23 is supplied to error correction (ECC) circuits 24V, 24A and 24S, which correct and modify errors by using a predetermined error correction code. More particularly, the ECC circuit 24V corrects and modifies errors in the video data, the ECC circuit 24A corrects and modifies errors in the audio data recorded in audio regions "audio 1" and "audio 2", and the ECC circuit 24S corrects errors in the subcode data.

The output signal of the ECC circuit 24A is supplied to an audio reproduction processing circuit 35 which decodes the audio data and outputs a reproduced digital audio signal to an output terminal 33A.

ECC circuit 24S corrects errors in the reproduced subcode data and outputs a reproduced subcode via terminal 33S, from which the subcode is supplied to a system controller (not shown) which controls the overall operations of the VTR.

The output signal of ECC circuit 24V is supplied to a frame desegmentation circuit 25. Frame desegmentation circuit 25 separates each component of the block encoded picture data and coverts the reproducing system clock to a picture system clock.

Each data component separated in the frame desegmentation circuit 25 is supplied to a block decoding circuit 26. The block decoding circuit 26 decodes the received data in accordance with the original data of each block and supplies the decoded data to a distribution circuit 27. The distribution circuit 27 separates a luminance signal and a color difference signal from the received decoded data. The luminance and color difference signals are respectively supplied to block desegmentation circuits 28 and 29. The block desegmentation circuits 28 and 29 function in a substantially opposite manner to that of block segmentation circuits 5 and 6 of FIG. 1. More specifically, the block desegmentation circuits 28 and 29 convert the received block sequence signals into raster scanning sequence signals.

The decoded luminance signal from the block desegmentation circuit 28 is supplied to an interpolation filter 30 which converts the sampling rate of the luminance signal from 3 fs to 4 fs (4 fs=13.5 MHz) by interpolating the data. The digital luminance signal Y from the interpolation filter 30 is supplied to an output terminal 33Y.

On the other hand, a line sequential digital color difference signal from the block desegmentation circuit 29 is supplied to a distribution circuit 31. The distribution circuit 31 separates digital color difference signals U and V from the line sequential digital color difference signal. The separated digital color difference signals U and V are supplied from the distribution circuit 31 to an interpolation circuit 32. The interpolation circuit 32 interpolates the received decoded picture element data to obtain the line and picture element data which had been previously thinned out by circuit 4 of FIG. 1.

The interpolation circuit 32 supplies digital color difference signals U and V, having a combined sampling rate of 4 fs, to output terminals 33U and 33V, respectively.

It will also be noted that error correction circuit 24I, which receives the output of TBC circuit 23, performs error correction code processing on the ID signal, and on the parity signal generated by parity generating circuit 10I of FIG. 1. A corrected ID signal output from ECC circuit 24I is provided at output terminal 33I.

Figure 5:
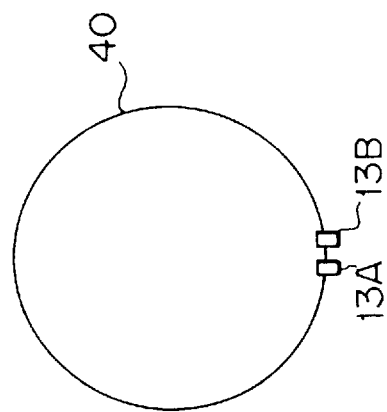
FIG. 5 is a schematic diagram illustrating recording and reproducing head locations.

As shown in FIG. 5, magnetic heads 13A and 13B are mounted in proximity to each other on a rotary drum 40. For example, heads 13A and 13B may be fabricated together in an integrated head unit. A magnetic tape (not shown) is obliquely wound on the circumferential surface of rotary drum 40 at a winding angle that is, for example, approximately 180°. Accordingly, both heads 13A and 13B scan the magnetic tape simultaneously for recording or reproduction of data. Heads 13A and 13B preferably have mutually different azimuth angles in the so-called double azimuth head arrangement. For example, the azimuth angle of one of the heads may be +20°, and the azimuth angle of the other head, −20°. As is well known to those skilled in the art, upon reproduction the amount of crosstalk between adjacent tracks, respectively formed on the magnetic tape by magnetic heads 13A and 13B, is decreased due to azimuth loss.

Figure 6:
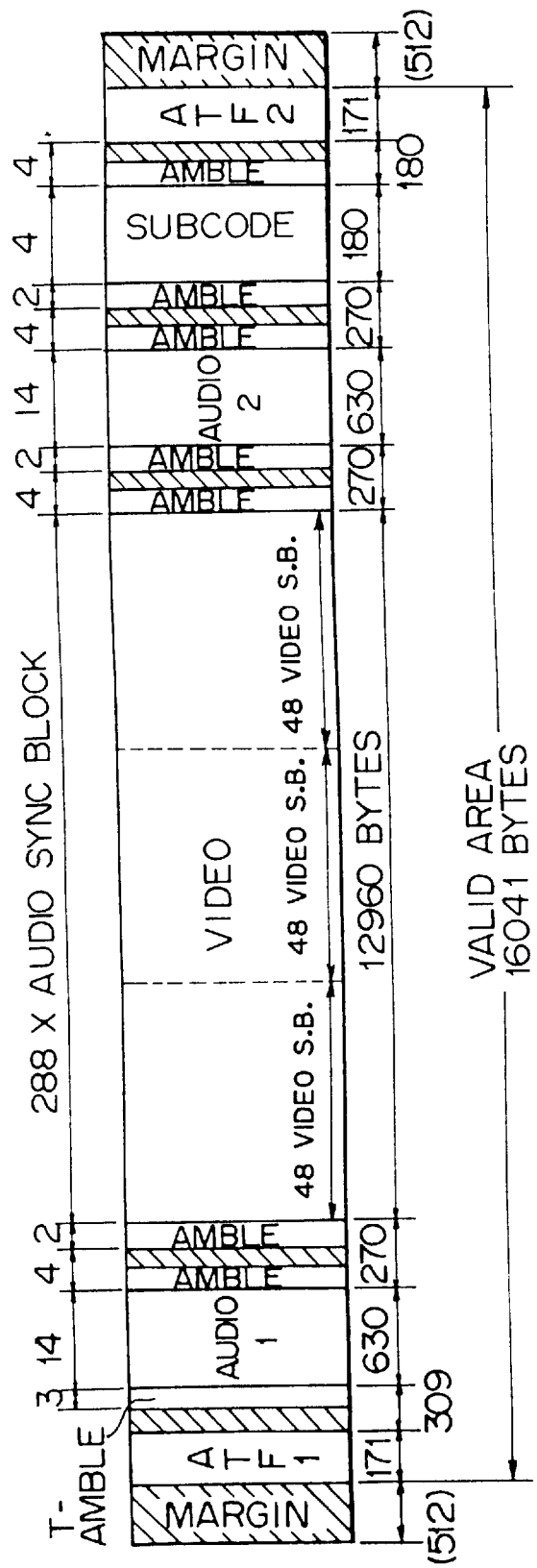
FIG. 6 is a schematic illustration of a recording track format used in the VTR of FIGS. 1 and 2.

There will now be described, with reference to FIG. 6, a format in which the data is recorded in each track. In FIG. 6, the left end of the track is the end at which the recording head enters and the head then longitudinally traverses the track, exiting from the right end. In the portions of the track in which hatching appears, no data is recorded, these portions being either margins or interblock gaps (IBGs). It will also be noted that a preamble region and a postamble region are disposed, respectively, before and after each of the data recording regions. In these regions there is typically recorded a pulse signal having the same frequency as the data clock for the data recorded in the respective region. On the basis of these signals an appropriate data extraction clock frequency can be provided by a phase locked loop (PLL).

Margins (i.e. regions without data) are provided at the beginning and end of the track. Adjacent to the respective margins are recorded ATF pilot signals ATF 1 and ATF 2. Following pilot signal ATF 1 is an audio signal recording region "audio 1". Next are a video signal recording region, an audio signal recording region "audio 2" and a subcode recording region, which are then followed by the aforementioned pilot signal ATF 2. The length of the track, exclusive of margins, is equivalent to an area for recording 16,041 bytes. The pilot signals ATF 1 and ATF 2 are recorded at the respective ends of the track because the contact of the magnetic heads with the tape is less reliable in those areas. Further, in a high speed reproduction mode, in which the transport speed for the magnetic tape is higher than in recording mode, the contact of the magnetic heads with the tape is less reliable at the end of the track than at the beginning, so that the subcode is recorded towards the end of the track.

The recorded data is in the form of sync blocks, each of which, as will be seen, is composed of a block synchronizing signal, an ID signal, the data itself, and error correction code signals. The order of the respective components of each block is as listed just above. The length of the sync blocks, and the amount of data contained therein, varies depending upon whether the data included therein is video data, audio data or subcode. It will be noted that different amounts of each type of data are included in the track.

In the format shown in FIG. 6 each of the regions except for the ATF pilot signals (ATF1 and ATF2) are defined in terms of length as multiples of an audio sync block. In particular, audio recording regions "audio 1" and "audio 2" are each 14 audio sync blocks long. The video region is 288 audio sync blocks long and the subcode region has a length of 4 audio sync blocks. The respective lengths of the amble regions and IBGs are defined as shown in FIG. 6. Defining all of the regions in terms of audio sync blocks permits simplification of the timing control circuitry which is used to define the regions during recording and reproduction.

Figure 7A:
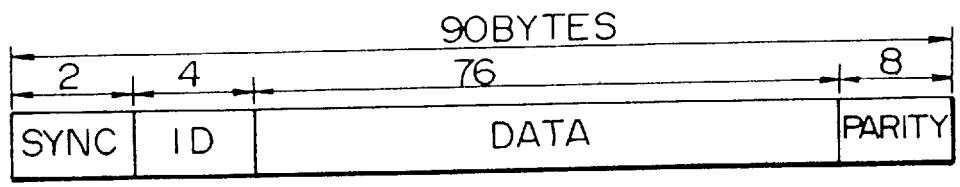
FIGS. 7A–7G are schematic illustrations of data block formats and correction coding schemes used in the format of FIG. 6.

The format for a video data sync block is shown in FIG. 7A. The length of the entire block is 90 bytes, which is twice the length of an audio sync block. Accordingly, the video recording region of each track is made up of 144 video sync blocks. Each video sync block consists of the following sections, in the order stated: block synchronizing signal (two bytes), ID signal (4 bytes), data (76 bytes) and parity symbols (8 bytes).

Figure 7B:
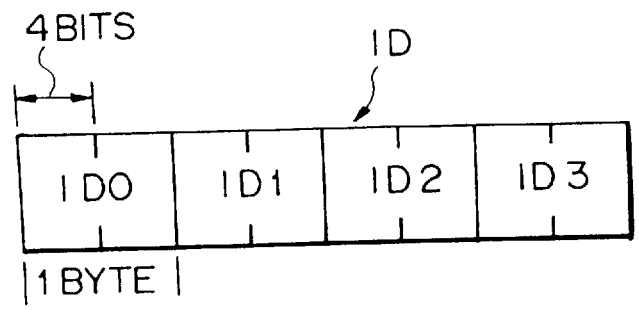
Figure 7C:
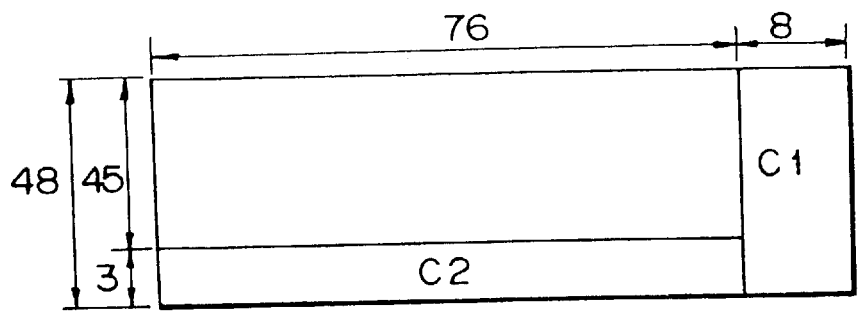

The error correction coding method used for the video data is schematically illustrated in FIG. 7C. First, referring briefly to FIG. 6, the video recording region is divided into three sections, each consisting of 48 video sync blocks. As will be seen, video signal information is recorded in the "data" portions (FIG. 7A) of 45 of the 48 sync blocks and parity code is recorded in the "data" portions of the remaining 3 sync blocks of the group of 48 sync blocks. For parity coding purposes the 45 sync blocks, each containing 76 bytes of video information, are considered to form a 76 column by 45 line matrix as shown in FIG. 7C. Parity code symbols for each of the 45 lines (referred to as "inner code" or "C1 parity") are provided in the form of 8 bytes at the end of each line. These 8 bytes are recorded in the "parity" portions (FIG. 7A) of the respective sync blocks. In addition, there are also provided three lines of parity symbols (referred to as "outer code" or "C2" parity) for the 76 columns, along with accompanying C1 parity code symbols for the additional three lines. In other words, of the 48 sync blocks provided in each one-third section of the video recording region, 45 are for video data itself, each sync block including 8 bytes of C1 parity code, while the remaining three sync blocks are for C2 parity code and C1 parity for the C2 parity code.

Figure 7D:
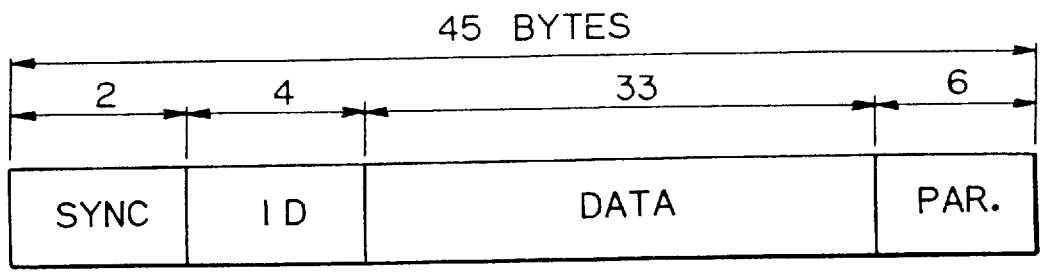
Figure 7E:
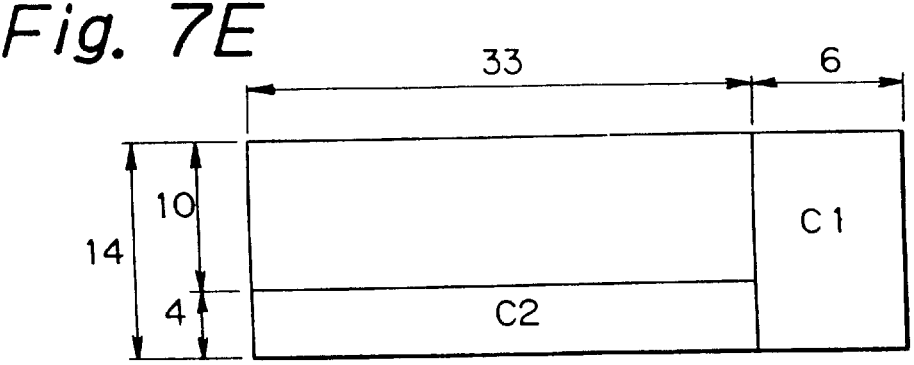

Turning now to the audio data sync block format, and FIGS. 7D and 7E, it will be noted that each audio sync block is 45 bytes in length, made up of a block synchronizing signal (2 bytes), an ID signal (4 bytes), data (33 bytes) and parity symbols (6 bytes), in the order as just stated. Of the 14 sync blocks making up each of the audio regions, ten are for the audio data itself and the remaining four are for C2 parity (column parity) symbols. It will be noted that all 14 of the sync blocks include C1 line parity symbols for the audio data or C2 parity code contained therein.

Figure 7F:
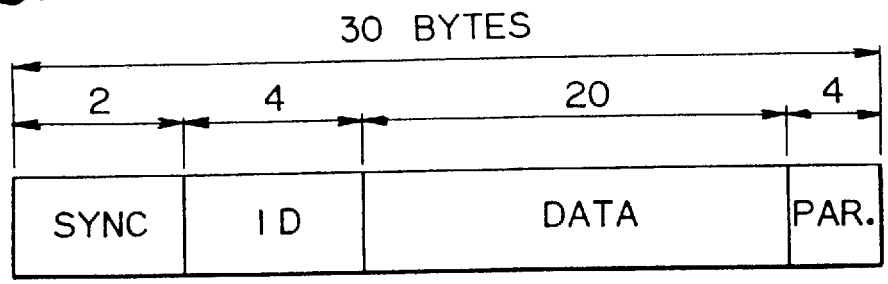
Figure 7G:
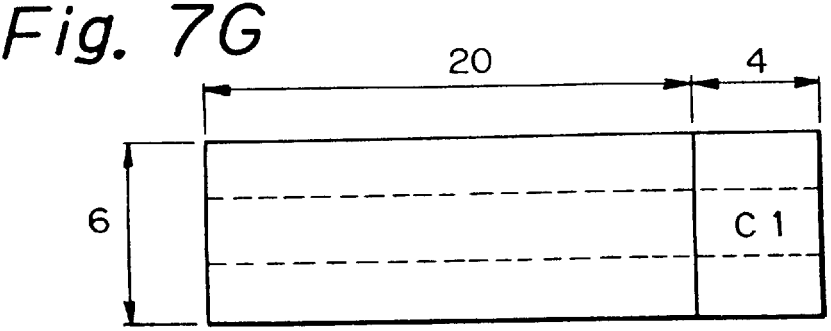

FIGS. 7F and 7G show the sync block format for the subcode region. Each subcode sync block is 30 bytes in length, consisting of a block synchronizing signal (2 bytes), an ID signal (4 bytes), data (20 bytes) and parity symbols (4 bytes), in the order as stated. No outer code (C2) is provided for the subcode. Instead, each 40 bytes of data (i.e. a pair of lines or blocks) is provided with 8 bytes of C1 parity symbols, four of which are recorded in one block of the pair, the other four being recorded in the other block. As a result, the six sync blocks of the subcode region contain 120 bytes of subcode data. It will be noted that the six subcode sync blocks occupy an area equivalent to four audio data sync blocks.

In each type of sync block (video data, audio data, subcode) the length of the ID signal section is the same, namely four bytes. As shown in FIG. 7B, the four bytes are labeled ID0, ID1, ID2 and ID3. The first three bytes contain bits for identifying such items as the address of the respective sync block, data type, video data system (PAL, NTSC, HD, SD), and so forth. As will be described below in more detail, the three bytes ID0, ID1 and ID2 are, in accordance with the invention, preferably divided into portions consisting of four bits or less. Unlike the video and audio data, the bit length of the ID signal can be freely set. Byte ID3 is for a parity code for the bytes ID0-ID2.

An example of the data making up the ID signal will now be described. In this example, ID0 is made up of a frame ID (1 bit), a data ID (2 bits), a broadcasting system ID (2 bits), an after-record ID (2 bits), and a mode ID (1 bit). The state of the frame ID bit is inverted from frame to frame. The data ID bits identify the data type of the respective sync block (video, audio 1, audio 2, or subcode). Of the two bits of the broadcasting system ID, one is used to identify either NTSC (525/60) or PAL (625/50). The other bit indicates either high resolution (HD) or standard resolution (SD). The after record bit indicates whether the data is after-recorded or is not after recorded. It will be understood that non-after-recording is indicated where either the data was originally recorded on the tape or where all of the data tracks have been overwritten. In this mode, the tracking control pilot signals are overwritten. In after-recording mode, data is rewritten in some or all of the previously formed data regions. The mode ID indicates whether the tape is a pre-recorded ("video-soft") tape or has been recorded by the user.

Byte ID1 is made up of a six bit track number and two additional bits. The six bit track number is provided to accommodate video signals, such as HD signals, in which a large amount of information is recorded. The additional two bits are reserved for future uses.

Byte ID2 is an 8 bit sync block number. A unique sync block number is assigned to each sync block in the track.

Byte ID3 consists of parity code symbols used for detecting and correcting an error in bytes IDO–ID2.

Bytes ID0–ID2 are generated by the ID generating circuit 17 of FIG. 1. Byte ID3 is generated by the parity generating circuit 10I. More particularly, the three bytes ID0–ID2 are divided in parity generating circuit 10I to form six symbols of four bits each. The parity generating circuit 10I then generates two symbols of parity code, each consisting of four bits, in accordance with an error correction code such as the Reed-Solomon code. In other words, a Reed-Solomon code which has a data length of six symbols and a parity of two symbols is used. As a result, ECC circuit 24I (FIG. 2) in the reproducing section of the VTR can correct an error in one of the six fourbit symbols into which ID0-ID2 were divided. Consequently, in the error detection and correction system according to the present invention, a six data symbol/two parity symbol ReedSolomon code is used in place of the conventional three data byte/one parity byte error detection code. It will be seen that the data redundancy is the same in the error correction system of the present invention as in the conventional error detection system. However, the present invention provides for correction of an error in the ID signal, while providing the capability of detecting more than one error.

It should be understood that the above-mentioned error correction coding, with generation of two parity symbols, is an example. As an alternative, it is possible to generate three or more parity symbols for providing additional error correction capability.

It should also be understood that the present invention can be applied to digital recording systems other than a video tape recorder. One example of such a recording system is an apparatus for recording PCM audio signals.

Having described a specific preferred embodiment of the present invention with reference to the accompanying drawings, it is to be understood that the invention is not limited to that precise embodiment, and that various changes and modifications may be effected therein by one skilled in the art without departing from the scope or spirit of the invention as defined in the appended claims.

What is claimed is:

1. A digital recording apparatus for recording digital information on a recording medium in the form of data blocks having a predetermined length, said apparatus comprising:

means for producing a plurality of outer code parity lines for the data blocks;

means for producing an inner code parity for each of the data blocks and plurality of outer code parity lines;

means for generating an ID signal for each of said data blocks, said ID signal exhibiting an amount of data and including a plurality of data bits which identify at least one of an address of the respective data block and a characteristic of the information contained in the respective data block;

means for dividing said ID signal into a sequence of ID symbols;

means for generating parity symbols according to a Reed-Solomon error correction code and exhibiting an amount of data, said parity symbols being operable to correct at least one error in said sequence of ID symbols and detect at least two errors in said sequence of ID symbols, the amount of data of said parity symbols being substantially less than the amount of data of said ID signal; and means for recording the data blocks on the recording medium with the plurality of outer code parity lines and the inner code parity and for recording said parity symbols on said recording medium with said ID signal.

2. A digital recording apparatus according to claim 1; wherein said digital information includes a video signal.

3. A digital recording apparatus according to claim 1; wherein said means for generating is operative to generate two parity symbols for said sequence of ID symbols.

4. A digital recording apparatus according to claim 1; wherein said means for generating is operative to generate at least three parity symbols for correcting at least two errors in said sequence of ID symbols.

5. A method of recording digital information on a recording medium in the form of data blocks having a predetermined length, comprising the steps of:

producing a plurality of outer code parity lines for the data blocks;

producing an inner code parity for each of the data blocks and plurality of outer code parity lines;

generating an ID signal for each of said data blocks, said ID signal exhibiting an amount of data and including a plurality of data bits which identify at least one of an address of the respective data block and a characteristic of the information contained in the respective data block;

dividing said ID signal into a sequence of ID symbols;

generating parity symbols according to a Reed-Solomon error correction code and exhibiting an amount of data, said parity symbols being operable to at least one error in said sequence of ID symbols and detect at least two errors in said sequence of ID symbols, the amount of data of said parity symbols being substantially less than the amount of data of said ID signal;

recording the data blocks on the recording medium with the plurality of outer code parity lines and the inner code parity; and recording said parity symbols on said recording medium with said ID signal.

6. A method of recording digital information according to claim 5; wherein said digital information includes a video signal.

7. A method of recording digital information according to claim 5; wherein the step of generating parity symbols generates two parity symbols for said sequence of ID symbols.

8. A method of recording digital information according to claim 5; wherein the step of generating parity symbols generates at least three parity symbols for correcting at least two errors in said sequence of ID symbols.

* * * * *